United States Patent
Han et al.

(10) Patent No.: US 11,726,962 B1
(45) Date of Patent: Aug. 15, 2023

(54) INLINE DEDUPLICATION BETWEEN NODES IN STORAGE SYSTEMS

(71) Applicant: Dell Products L.P., Round Rock, TX (US)

(72) Inventors: Geng Han, Beijing (CN); Vladimir Shveidel, Pardes-Hana (IL); Changyu Feng, Beijing (CN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 17/585,177

(22) Filed: Jan. 26, 2022

(51) Int. Cl.
  *G06F 16/174* (2019.01)
  *G06F 16/178* (2019.01)
  *G06F 16/14* (2019.01)

(52) U.S. Cl.
  CPC ........ *G06F 16/1748* (2019.01); *G06F 16/152* (2019.01); *G06F 16/178* (2019.01)

(58) Field of Classification Search
  CPC ... G06F 16/1748; G06F 16/152; G06F 16/178
  See application file for complete search history.

(56) References Cited

U.S. PATENT DOCUMENTS

| | | | |
|---|---|---|---|
| 11,609,854 B1 * | 3/2023 | Shatsky | G06F 12/0802 |
| 2021/0342153 A1 * | 11/2021 | Han | G06F 9/5016 |
| 2023/0063730 A1 * | 3/2023 | Chen | G06F 16/2379 |
| 2023/0087778 A1 * | 3/2023 | Borzov | G06F 16/1844 |

* cited by examiner

*Primary Examiner* — Angelica Ruiz
(74) *Attorney, Agent, or Firm* — Krishnendu Gupta; Deepika Bhayana; Derek Lam

(57) ABSTRACT

Techniques described herein coordinate inline deduplication among nodes in a storage system. The method includes storing, in a page descriptor ring on a node, data and a fingerprint associated with the data in an entry. The method includes determining that a flushing work set (FWS) has been frozen. The node identifies, in the page descriptor ring, entries associated with the frozen FWS and having fingerprints with a parity associated with the node. The node deduplicates the entries based on a fingerprint database on the node. The node synchronizes deduplication of the frozen FWS with a peer node, so as to receive deduplication results concerning entries having fingerprints with a parity associated with the peer node. The node replaces entries in the page descriptor ring with the deduplication results from the peer node, and flushes entries in the frozen FWS to a storage device.

20 Claims, 10 Drawing Sheets

INLINE DEDUPLICATION BETWEEN NODES IN STORAGE SYSTEMS

BACKGROUND

Technical Field

This application relates to coordinated inline deduplication between nodes in storage systems.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

The storage system may be organized into multiple nodes. Nodes can be organized in a cluster, and data can be replicated among the nodes so as to provide redundancy. Data deduplication (also referred to simply as "deduplication") is a space-saving technology intended to eliminate redundant (duplicate) data (such as, files) on a data storage system. By saving only one instance of a file, disk space can be significantly reduced. For example, suppose a file of size 10 megabytes (MB) is stored in ten folders of each employee in an organization that has ten employees. As a result, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for coordinated inline deduplication among nodes in a storage system. The method includes storing, in a page descriptor ring on a node, data and a fingerprint associated with the data in an entry. The method includes determining that a flushing work set (FWS) has been frozen. The node identifies, in the page descriptor ring, entries associated with the frozen FWS and having fingerprints with a parity associated with the node. The node deduplicates the entries based on a fingerprint database on the node. The node synchronizes deduplication of the frozen FWS with a peer node, so as to receive deduplication results concerning entries having fingerprints with a parity associated with the peer node. The node replaces entries in the page descriptor ring with the deduplication results from the peer node, and flushes entries in the frozen FWS to a storage device.

The node may be associated with fingerprints of an even parity and the peer node is associated with fingerprints of an odd parity. The fingerprints in the fingerprint database on the node may consist of fingerprints of one parity.

The method may include communicating with the peer node to exchange information about deduplication results concerning entries having fingerprints with one parity and deduplication results concerning entries having fingerprints with the opposite parity. The node may send sequence identification numbers of entries in the page descriptor ring that have fingerprints of the parity associated with the node, and have been deduplicated, and pointers to data. The node may receive sequence identification numbers of entries in the page descriptor ring that have fingerprints of the parity associated with the peer node, and have been deduplicated, and pointers to data. The node may overwrite data in the entries with pointers to the data.

Another aspect of the current technique is a system, with a processor, for coordinated inline deduplication among nodes in a storage system. The processor may be configured to perform any process in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below are techniques for coordinating inline deduplication among nodes in a storage system. The method includes storing, in a page descriptor ring on a node, data and a fingerprint associated with the data in an entry. The method includes determining that a flushing work set (FWS) has been frozen. The node identifies, in the page descriptor ring, entries associated with the frozen FWS and having fingerprints with a parity associated with the node. The node deduplicates the entries based on a fingerprint database on the node. The node synchronizes deduplication of the frozen FWS with a peer node, so as to receive deduplication results concerning entries having fingerprints with a parity associated with the peer node. The node replaces entries in the page descriptor ring with the deduplication results from the peer node, and flushes entries in the frozen FWS to a storage device.

A data storage system can use a page descriptor ring to hold data from I/O requests before the data is flushed to storage. In general, the head is a marker that tracks the last entry in the ring that received data, and as new data is added to the ring, the head is incremented accordingly. In many embodiments, the ring is configured such that when the head reaches the end of the ring, the marker is moved to the beginning of the ring.

To manage data being entered into the ring and data being flushed from the ring to storage, data structures known as flushing work sets (FWS) may be used. Each FWS may be associated with a contiguous set of entries in the page descriptor ring, although an FWS may alternatively be associated with a set of containers. The data storage system may add data to one FWS until the FWS is almost full, at which point, the data storage system switches and begins adding data to the other FWS while flushing data in the previous FWS to storage. With respect to these techniques, the FWS receiving data will be called the "filling FWS" while the FWS whose data is being flushed will be called the "frozen FWS".

The storage system may have multiple nodes, and at least some of the nodes may be organized in a cluster. Data may be replicated among nodes in a cluster, for redundancy. The FWSs among the nodes mirror one another, i.e., the FWSs on the nodes occupy the same locations on their respective page descriptor ring and include the same contents. Challenges arise when deduplicating the data of a FWS as the data is being flushed to storage.

The techniques described herein ensure that the nodes can deduplicate data from the same FWS efficiently while the FWS is being flushed to storage. In at least some implementations in accordance with the techniques as described herein, one or more of the following advantages can be provided: reduced memory required for storing fingerprints, performance gains in flushing data, and consistent deduplication across nodes in the storage system.

Figure 1:
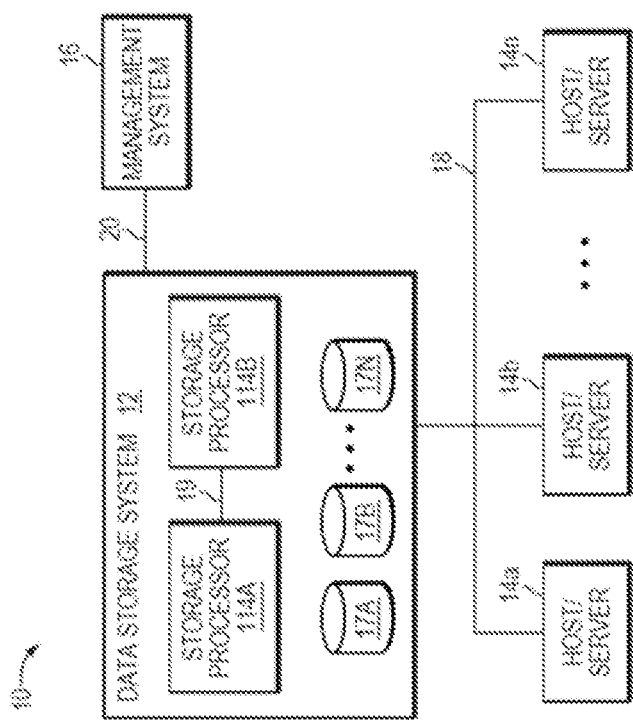
FIG. 1 depicts an example embodiment of a computer system that may be used in connection with performing the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein. Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
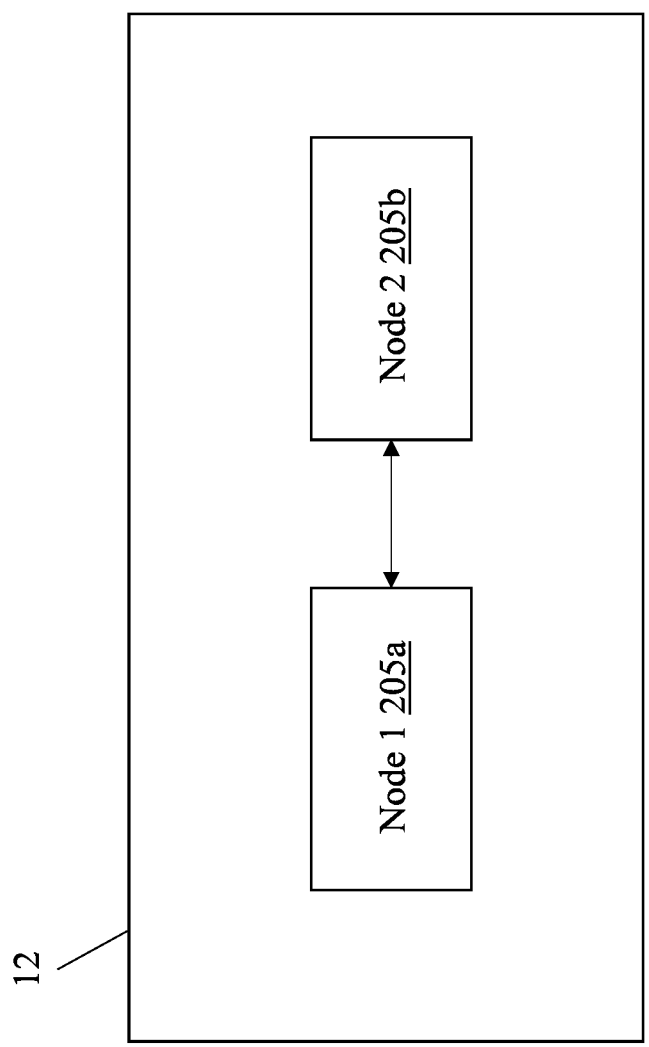
FIG. 2 is a block diagram depicting exemplary nodes among which the elements of the computer system of FIG. 1 may be distributed.
Figure 3:
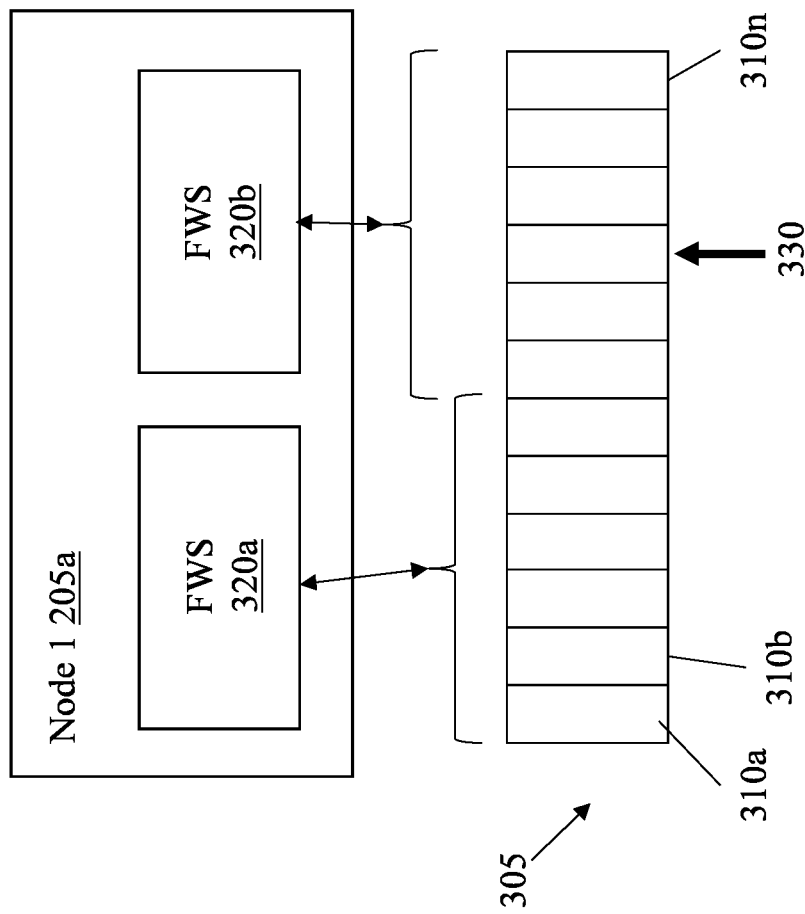
FIG. 3 is an exemplary diagram showing the page descriptor ring and flushing work sets on one node.

FIG. 2 is a block diagram depicting exemplary nodes 205a, 205b (individually and collectively, "205") among which the elements of the storage system 12 may be distributed. Although FIG. 2 depicts two nodes 205a, 205b various embodiments of the invention may include any number of nodes. The nodes 205 may form a cluster. Each node 205 may receive I/O requests, and communicate with one another to ensure that the data on the nodes 205 are consistent with one another. FIG. 3 is an exemplary diagram showing the page descriptor ring 305 and FWSs 320a, 320b (individually and collectively, "320") on one node 205a. The page descriptor ring 305 includes multiple entries 310a, 310b, . . . , 310n ("310"), each corresponding to a page of data. The head 330 is a marker that points to the next entry 310 available for receiving data. In some embodiments, the head 330 is represented as an offset within the page descriptor 305, or a sequence ID number. When the node 205a receives new data to store, the data is stored in the entry 310 corresponding to the head 330 and the head 330 is advanced to the next entry 310. As shown, each FWS 320 corresponds to a different set of entries 310 in the page ring descriptor 305. When the node 205a determines that the filling FWS 320 should be switched, e.g., from FWS 320a to FWS 320b, the node 205a continues to add data to the ring 305. FWS 320a becomes the frozen FWS 320 whose associated entries in the ring 305 are flushed to storage, while FWS 320b becomes the filling FWS and receives incoming data. Although the embodiment of FIG. 3 depicts two FWSs 320, in other embodiments, more FWSs 320 may be used. As such, a node 205a may have one filling FWS 320, and multiple frozen FWSs 320.

Figure 4:
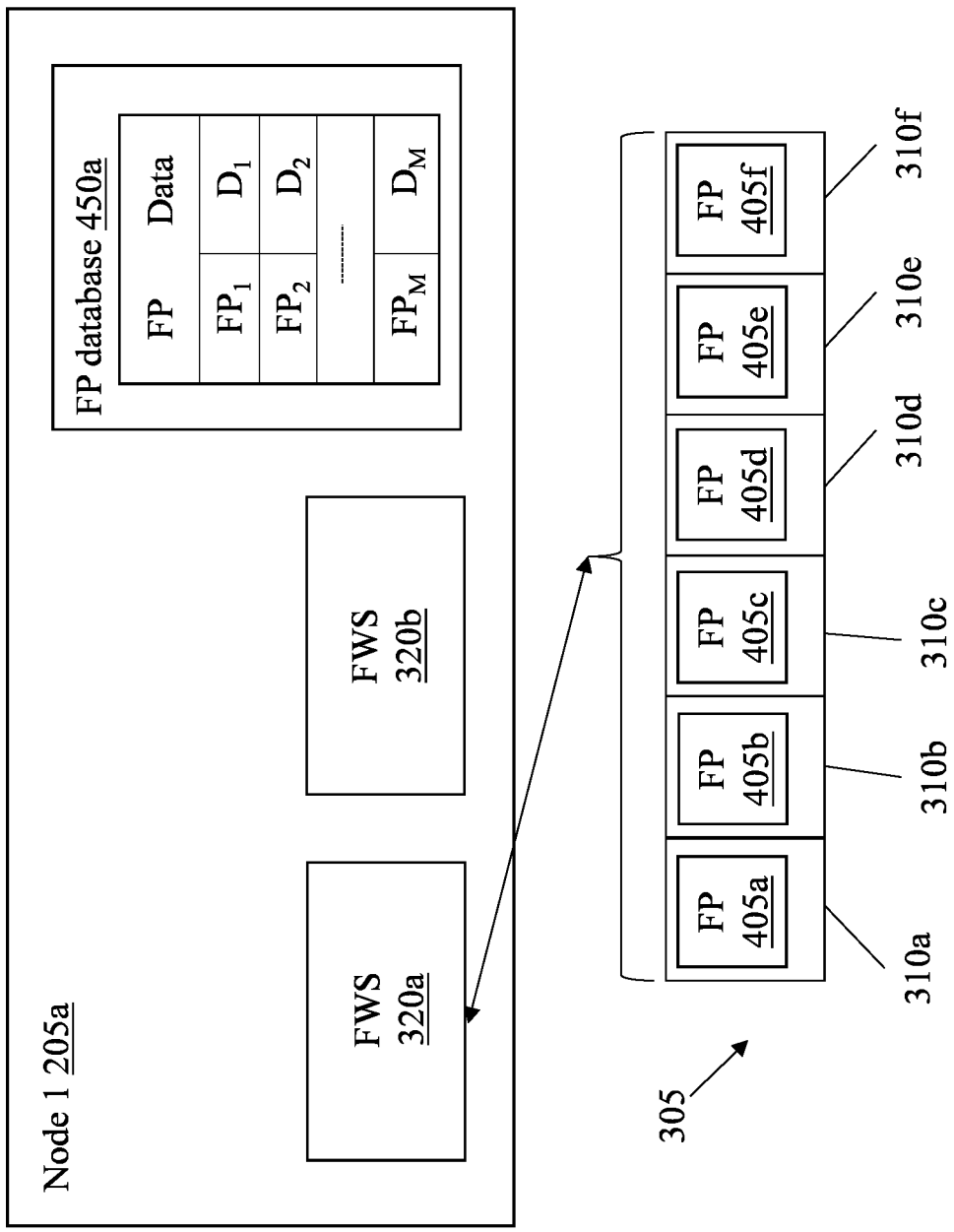
FIG. 4 is a schematic diagram showing fingerprints stored in the page descriptor ring on a node, and a fingerprint database storing fingerprints used for deduplication.

FIG. 4 is a schematic diagram showing fingerprints stored in the page descriptor ring on a node, and a fingerprint database storing fingerprints used for deduplication. For each I/O request, the node 205a determines a hash value 405 for the data to be stored (also referred to herein as the "fingerprint"). The node 205a may apply a cryptographic hash function to the data to obtain this value 405. In some embodiments, the hash function yields a 128-bit value from the 4096 bits in a page. The page of data and its associated fingerprint 405 may be stored together in an entry 310 in the page descriptor ring 305.

Furthermore, the node 205a includes a fingerprint database 450a used in duplication. The database 450a includes the fingerprints 405 of unique pages of data, in association with the locations where the data has been stored on a storage device 17. The fingerprint database 450a may be stored in memory. Given the volume of data handled by the storage system 10, a fingerprint database 450a may be sizable, putting strain on computing resources due to the limited amount of total memory on a node 205a. Thus, in some embodiments, the fingerprint database 450a on the node 205a stores only fingerprints of even parity (i.e., the last bit of the fingerprint is 0), while a fingerprint database 450b on the node 205b stores only fingerprints of odd parity (i.e., the last bit is 1).

Figure 5:
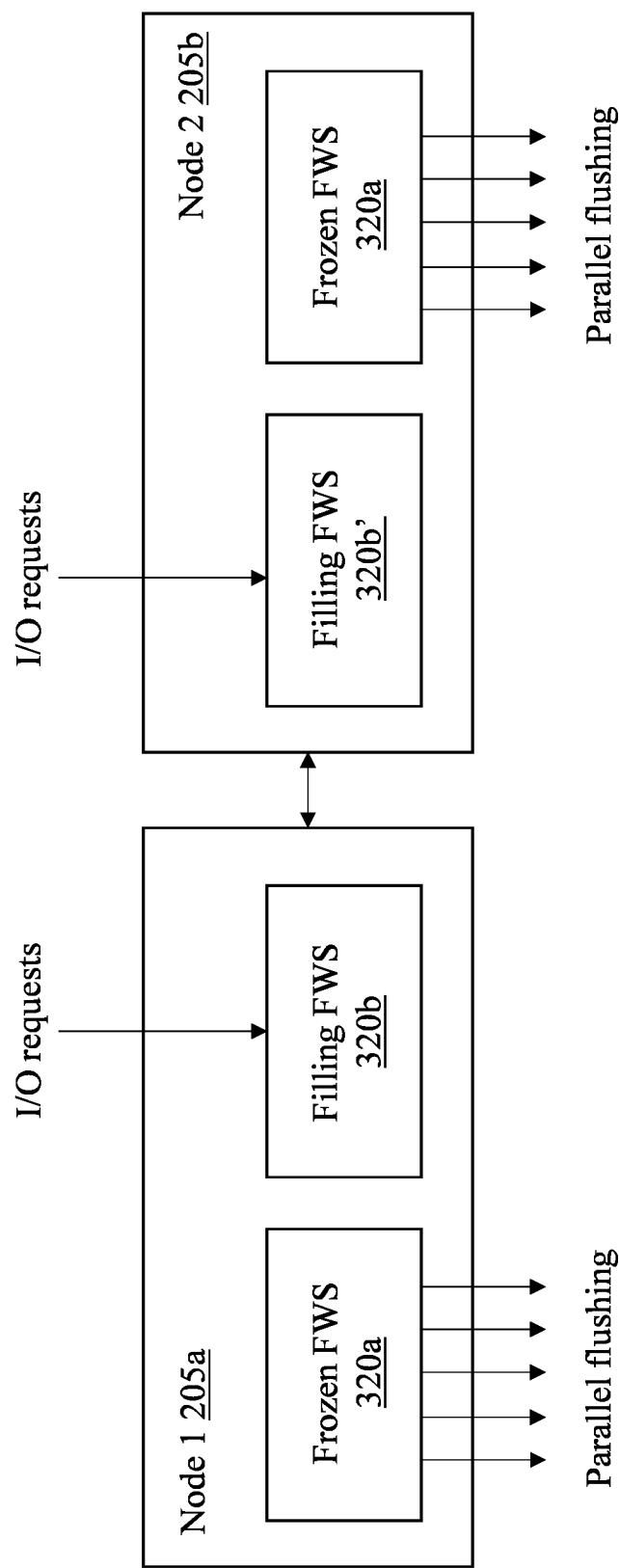
FIG. 5 is a schematic diagram showing the flushing work sets across two nodes.

FIG. 5 is a schematic diagram showing the FWSs 320a, 320b, 320a', 320b' across two nodes 205a, 205b. The FWSs 320, 320' across the nodes 205 mirror one another; the frozen FWSs 320a, 320a' are associated with the same data (i.e., the same entries 310 in the page descriptor ring 305), as are the filling FWSs 320b, 320b'. When the filling FWSs 320b, 320b' are receiving incoming data from I/O requests, both nodes 205a, 205b flush data associated with the frozen FWSs 320a, 320a' to storage.

Figure 6:
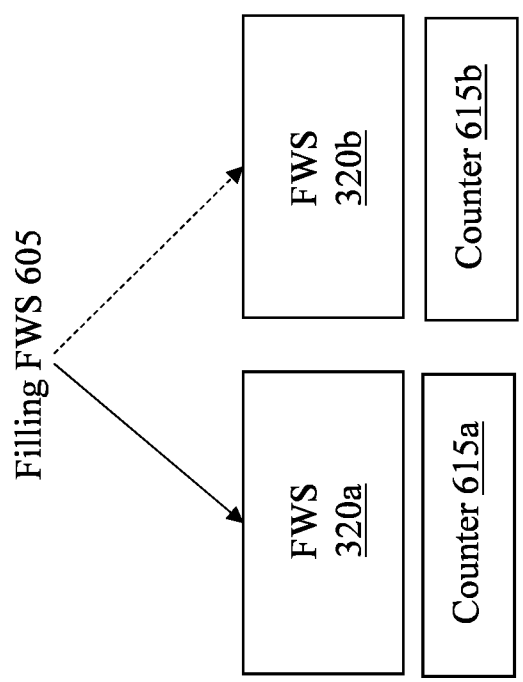
FIG. 6 depicts an exemplary pointer that identifies the flushing work set that is receiving data and counters indicating the number of outstanding I/O requests on the flushing work sets.

A pointer 605 that identifies the FWS 320 serving as the filling FWS 320 and counters 615a, 615b that track the number of I/O requests, for their respective FWSs 320a, 320b, that have not yet been logged in the page descriptor ring 305, as shown in FIG. 6. In this embodiment, the counters 615a, 615b pertain to the I/O requests for the entire FWSs 320, but in other embodiments, an FWS 320 may have multiple counters 615, each associated with a different processor 114 in the data storage system 12.

When a node 205a determines that the filling FWS 320 is nearing its capacity, and/or that the frozen FWS 320 has finished flushing its data to storage, the node 205a may switch FWSs 320 by setting the pointer 605 to the desired FWS 320. After the switch occurs, all subsequent I/O requests are directed to the new filling FWS 320.

Figure 7:
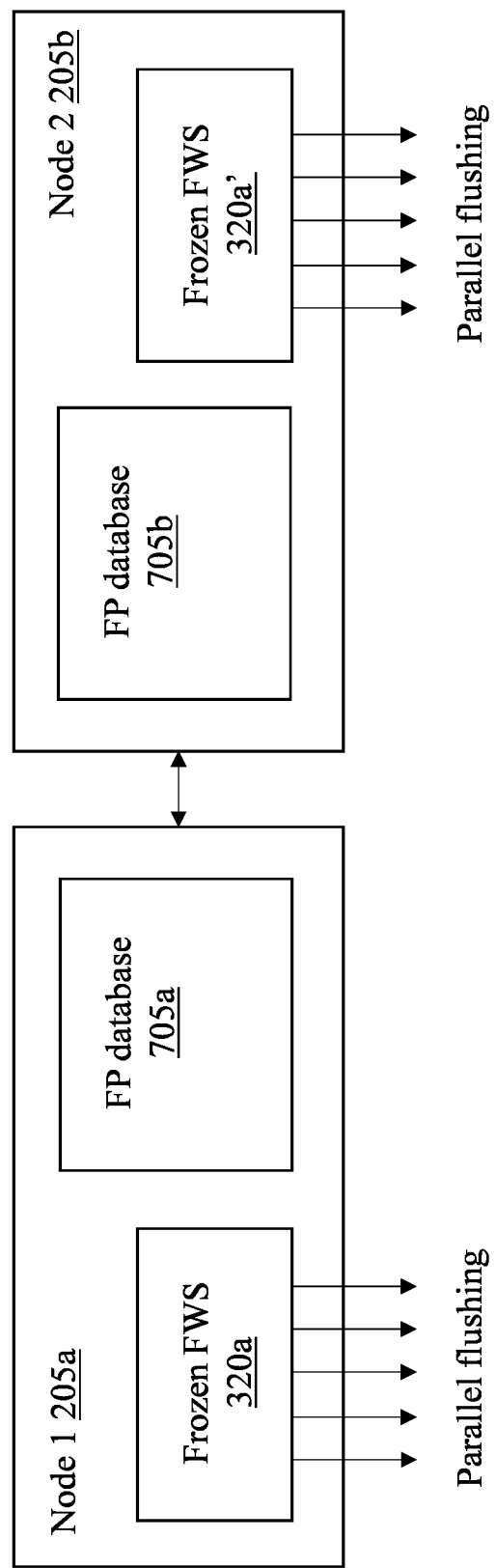
FIG. 7 is a schematic diagram showing the nodes coordinating deduplication of data in a FWS as the data is flushed to a storage device.

FIG. 7 is a schematic diagram showing the nodes 205 coordinating deduplication of data in a FWS 320a, 320a' as the data is flushed to storage devices 17. Each node 205 includes a fingerprint database 705 in its memory, with one database 705a storing fingerprints of even parity and the other database 705b storing fingerprints of odd parity (or vice versa).

When node 205a switches the filling FWS 320 by setting the pointer 605 to the desired FWS, the node 205a communicates the switch to node 205b. The two nodes 205a, 205b begin flushing data from the now frozen FWS 320a, 320a'. As explained with respect to FIG. 4, the fingerprint 405 is stored alongside the corresponding page of data in the entry 310 in the page descriptor ring 305.

In this embodiment, the fingerprint database 705a on node 205a stores fingerprints 405 of even parity, and thus, the node 205a assumes deduplication of solely data with fingerprints 405 of that parity. Consequently, the node 205a filters from FWS 320a the entries 310 with fingerprints 405 of even parity. Each such fingerprint 405 is compared to the entries in the fingerprint database 705a, and if a match is found, the node 205a replaces the data in the page descriptor ring 305 with a pointer to the data, as obtained from the database 705a.

Similarly, the fingerprint database 705b on node 205b stores fingerprints 405 of odd parity, and thus, the node 205b assumes deduplication of solely data with fingerprints 405 of that parity. Consequently, the node 205b filters from FWS 320a' the entries 310 with fingerprints 405 of odd parity. Each such fingerprint 405 is compared to the entries in the fingerprint database 705b, and if a match is found, the node 205b replaces the data in the page descriptor ring 305 with a pointer to the data, as obtained from the database 705b.

When the nodes 205a, 205b finish deduplicating data in the FWS 320a with fingerprints 405 of their respective parity, the nodes 205a, 205b communicate to synchronize the results of their processes. As a result, the FWS 320a, 320a' on each node 205a, 205b becomes fully deduplicated prior to flushing. In some embodiments, the node 205a transmits its results by identifying the entries 310 that have been deduplicated and pointers corresponding to the stored data. For example, the node 205a may send sequence ID numbers of such entries 310, with the pointers. The node 205b may use the sequence ID numbers to identify entries 310' in its page descriptor ring 305' to alter, and replace the data stored therein with the pointers obtained from the node 205a. Similarly, node 205b may send comparable information to node 205a to deduplicate entries 310' whose fingerprints 405 have parity pertaining to the node 205b.

Figure 8A:
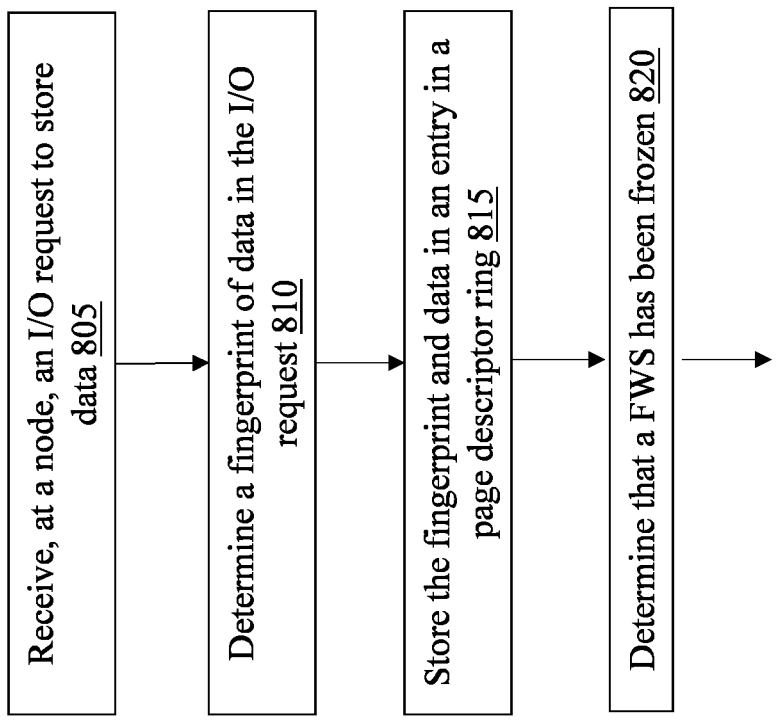
FIGS. 8A-8C are exemplary flow diagrams depicting coordinated inline deduplication among nodes in a storage system.
Figure 8B:
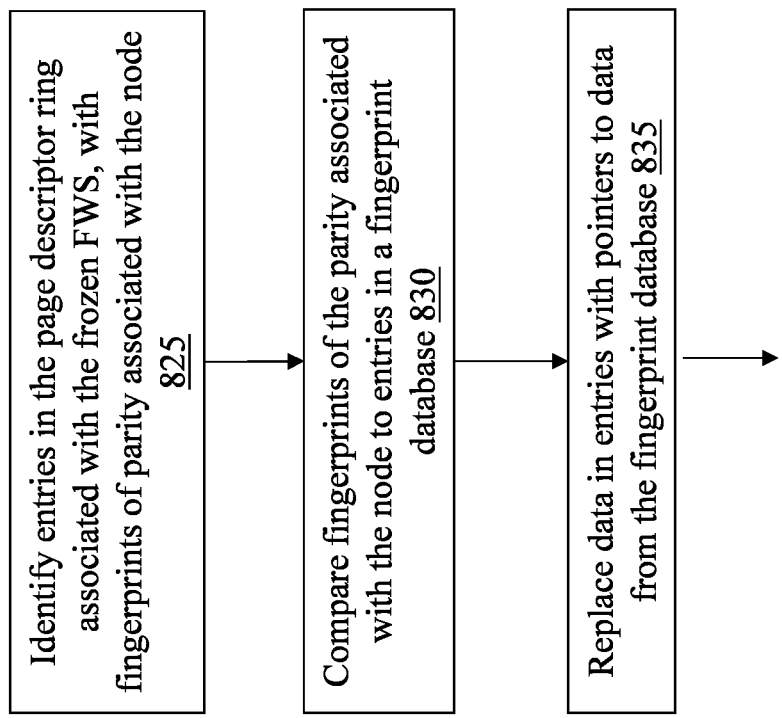
Figure 8C:
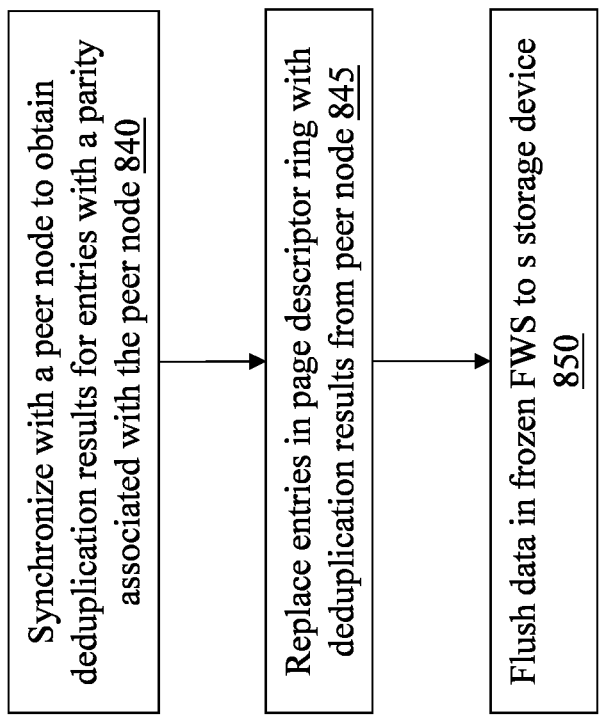

FIG. 8A-8C is an exemplary flow diagram of coordinated inline deduplication among nodes in a storage system. A node 205a receives an I/O request to store data (step 805). The node 205a determines a fingerprint 405 of the data in the I/O request (step 810), and stores the fingerprint 405 and the data in an entry 310 in a page descriptor ring 305 (step 815). The node 205a determines that a FWS 320a has been frozen (step 820). The node 205a identifies entries 310 in the page descriptor ring 305 that are associated with the frozen FWS 320a and include fingerprints 405 with a parity associated with the node 205a (step 825). The node 205a compares the fingerprints 405 with the parity associated with the node 205a to entries in a fingerprint database 705a (step 830). If a fingerprint 405 appears in the fingerprint database 705a, the data for the associated entry 310 is replaced with a pointer to data retrieved from the database 705a (step 835).

The node 205a synchronizes with a peer node 205b to obtain deduplication results for entries for the frozen FWS 320a with fingerprints 405 have a parity associated with the node 205b (step 840). The node 205a replaces entries in its page descriptor ring 305 with deduplication results from node 205b (step 845). The node 205a flushes entries associated with the frozen FWS 320a to a storage device 17 (step 850).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for coordinated inline deduplication among nodes in a storage system, the method comprising:
   storing, in a page descriptor ring on a node, data and a fingerprint associated with the data in an entry;
   determining that a flushing work set (FWS) has been frozen;
   identifying, in the page descriptor ring, entries associated with the frozen FWS and having fingerprints with a parity associated with the node;
   deduplicating the entries based on a fingerprint database on the node;
   synchronizing deduplication of the frozen FWS with a peer node, so as to receive deduplication results concerning entries having fingerprints with a parity associated with the peer node;
   replacing entries in the page descriptor ring with the deduplication results from the peer node; and
   flushing entries in the frozen FWS to a storage device.

2. The method of claim 1, wherein the node is associated with fingerprints of an even parity and the peer node is associated with fingerprints of an odd parity.

3. The method of claim 1, wherein fingerprints in the fingerprint database on the node consist of fingerprints of one parity.

4. The method of claim 1, wherein synchronizing the deduplication of the frozen FWS with the peer node comprises:
   communicating with the peer node to exchange information about deduplication results concerning entries having fingerprints with one parity and deduplication results concerning entries having fingerprints with the opposite parity.

5. The method of claim 1, wherein synchronizing the deduplication of the frozen FWS with the peer node comprises:
   sending, by the node, sequence identification numbers of entries in the page descriptor ring that (1) have fingerprints of the parity associated with the node, and (2) have been deduplicated, and pointers to data.

6. The method of claim 1, wherein synchronizing the deduplication of the frozen FWS with the peer node comprises:
   receiving, by the node, sequence identification numbers of entries in the page descriptor ring that (1) have fingerprints of the parity associated with the peer node, and (2) have been deduplicated, and pointers to data.

7. The method of claim 1, wherein replacing entries in the page descriptor ring with the deduplication results from the peer node comprises:
   overwriting data in the entries with pointers to the data.

8. A system for coordinated inline deduplication among nodes in a storage system, the system including a processor configured to:
   store, in a page descriptor ring on a node, data and a fingerprint associated with the data in an entry;
   determine that a flushing work set (FWS) has been frozen;
   identify, in the page descriptor ring, entries associated with the frozen FWS and having fingerprints with a parity associated with the node;
   deduplicate the entries based on a fingerprint database on the node;
   synchronize deduplication of the frozen FWS with a peer node, so as to receive deduplication results concerning entries having fingerprints with a parity associated with the peer node;
   replace entries in the page descriptor ring with the deduplication results from the peer node; and
   flush entries in the frozen FWS to a storage device.

9. The system of claim 8, wherein the node is associated with fingerprints of an even parity and the peer node is associated with fingerprints of an odd parity.

10. The system of claim 8, wherein fingerprints in the fingerprint database on the node consist of fingerprints of one parity.

11. The system of claim 8, wherein the processor is further configured to:
   communicate with the peer node to exchange information about deduplication results concerning entries having fingerprints with one parity and deduplication results concerning entries having fingerprints with the opposite parity.

12. The system of claim 8, wherein the processor is further configured to:
   send, by the node, sequence identification numbers of entries in the page descriptor ring that (1) have fingerprints of the parity associated with the node, and (2) have been deduplicated, and pointers to data.

13. The system of claim 8, wherein the processor is further configured to:
   receive, by the node, sequence identification numbers of entries in the page descriptor ring that (1) have fingerprints of the parity associated with the peer node, and (2) have been deduplicated, and pointers to data.

14. The system of claim 8, wherein the processor is further configured to:
   overwrite data in the entries with pointers to the data.

15. A non-transitory computer readable medium comprising code stored thereon that, when executed, performs a method of coordinating inline deduplication among nodes in a storage system comprising:
   storing, in a page descriptor ring on a node, data and a fingerprint associated with the data in an entry;
   determining that a flushing work set (FWS) has been frozen;
   identifying, in the page descriptor ring, entries associated with the frozen FWS and having fingerprints with a parity associated with the node;
   deduplicating the entries based on a fingerprint database on the node;
   synchronizing deduplication of the frozen FWS with a peer node, so as to receive deduplication results concerning entries having fingerprints with a parity associated with the peer node;
   replacing entries in the page descriptor ring with the deduplication results from the peer node; and
   flushing entries in the frozen FWS to a storage device.

16. The non-transitory computer readable medium of claim 15, further comprising code stored thereon that, when executed, performs:
   communicating with the peer node to exchange information about deduplication results concerning entries having fingerprints with one parity and deduplication results concerning entries having fingerprints with the opposite parity.

17. The non-transitory computer readable medium of claim 15, further comprising code stored thereon that, when executed, performs:
   sending, by the node, sequence identification numbers of entries in the page descriptor ring that (1) have fingerprints of the parity associated with the node, and (2) have been deduplicated, and pointers to data.

18. The non-transitory computer readable medium of claim 15, further comprising code stored thereon that, when executed, performs:
   overwriting data in the entries with pointers to the data.

19. The non-transitory computer readable medium of claim 15, wherein the node is associated with fingerprints of an even parity and the peer node is associated with fingerprints of an odd parity.

20. The non-transitory computer readable medium of claim 15, wherein fingerprints in the fingerprint database on the node consist of fingerprints of one parity.

* * * * *